Patented Dec. 26, 1944

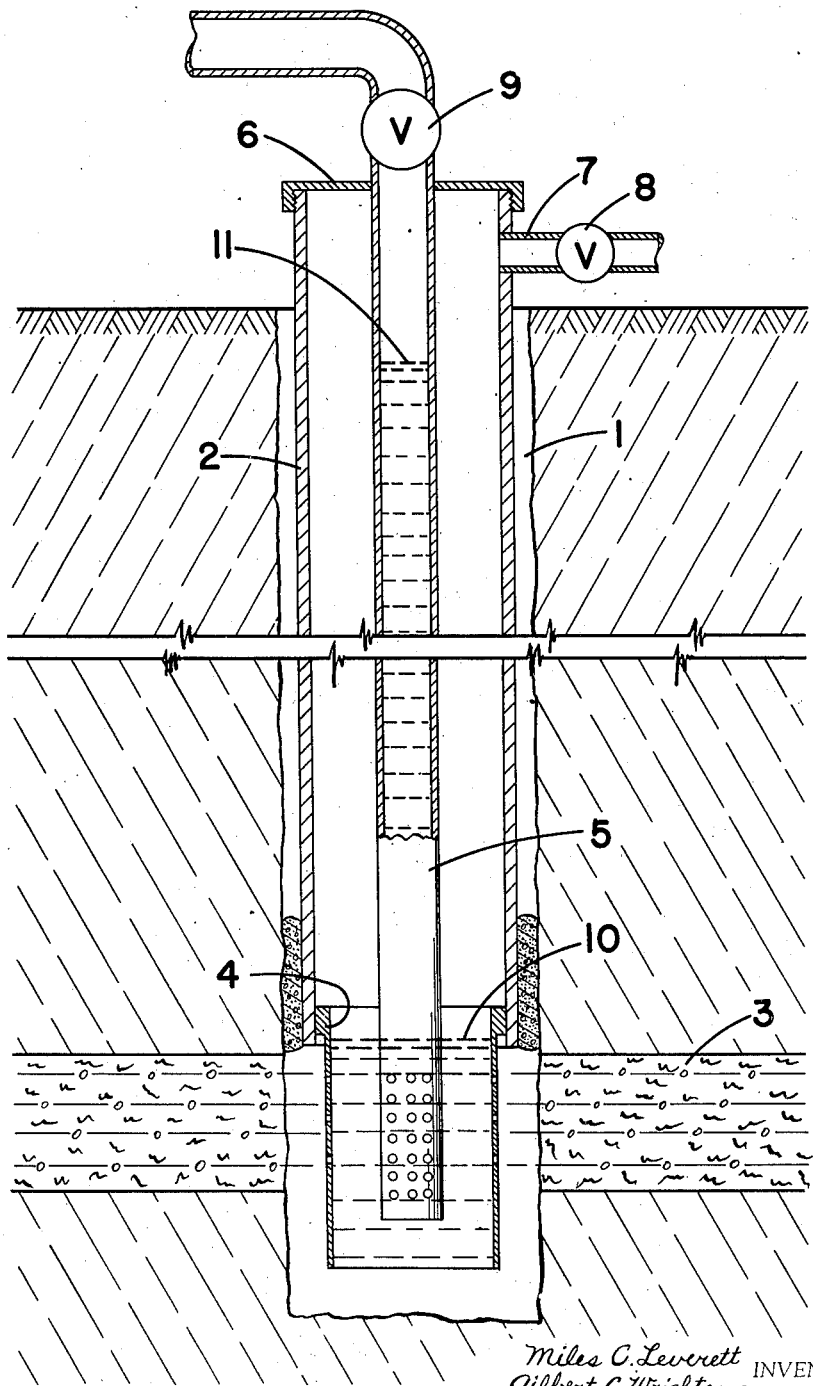

2,366,036

UNITED STATES PATENT OFFICE 2,366,036

PRODUCING OIL

Miles C. Leverett and Gilbert G. Wrightsman, Houston, Tex., assignors to Standard Oil Development Company, a corporation of Delaware Application November 21, 1941, Serial No. 419,900

3 Claims. (Cl. 166—22)

The present invention is directed to a method for selectively plugging formations traversed by a borehole and producing different fluids such as oil and water.

In the production of oil there is frequently a concurrent production of water, the magnitude of which is an important item in the economical operation of the well. A great many methods for reducing the amount of water produced with respect to the oil in such wells have been suggested, but, prior to the present invention, none of these methods afforded a solution to the problem. Chief among these methods are those in which a suspension or emulsion has been pumped into the producing formation, and those in which two or more materials capable of reacting with each other to produce a precipitate having certain desired characteristics have been pumped into the formation. In the former type of method, the suspended particles, whether solid or liquid, tend to filter out and do not penetrate into the formation a sufficient distance to be effective. In the latter type of treatment the reactive liquids are pumped into the formation in sequence. The first liquid introduced is forced back into the formation by the second liquid introduced. Experience has indicated that there is not a sufficient diffusion of the reactive liquids one into the other, to produce the desired bulk of precipitate in the formation. A particular treatment of the latter type is one in which a liquid capable of reacting with water already in the formation is forced into the formation. Here, again, there is insufficient mixing of said liquid and the water to form the desired quantity of precipitate for effective plugging.

Methods have been proposed for plugging off water sands by introducing a sealing agent into the sand. These methods have the disadvantage that the water producing sand must be accurately located and the oil producing formation must be protected during the treatment so that it, too, will not be plugged off. Of course, such methods are not applicable to the treatment of formations which produce both oil and water.

The principal object of the present invention is the provision of a treatment of the character described in which the necessity of identifying the water producing zone is eliminated.

An additional object of the present invention is the provision of a treatment of the character described in which there is introduced into the formations penetrated by a borehole an agent which, at the time of introduction, is in a mobile liquid state, permitting pumping of it to the desired distance from the borehole and which, after a predetermined time of residence in the formation at the temperature existing therein, will set to a solid soluble in petroleum oil, but insoluble in water.

In general, the method of the present invention includes the introduction into the producing formation of a homogeneous liquid resin of such a nature that it will condense further within the formation at the temperature thereof within a practicable period of time to form a solid material which is insoluble in water but soluble in oil. The solid resin plugs all of the formation which it penetrates, but does not effect a complete stoppage of flow of fluid in the formation. It must be understood that when a sand, for example, is saturated with a fluid, it is not possible to displace completely that fluid from the sand by passing another fluid through the sand. Thus, in the practice of the present invention, there is not formed in the well a solid homogeneous plug impervious to the flow of fluid. Such a result would be fatal to the achievement of the desired objective, since, in order for a well to go back on production after the treatment, there must be a flow of oil out of the producing formation. When the well is placed back on production after a treatment according to the present invention, the producing formation is more permeable to the flow of oil than to the flow of water, because of the solubility characteristics of the resin. As a result, a producing well having an undesirably high water-oil ratio can be readily and cheaply converted by the application of the method of the present invention into a well having a much lower water-oil ratio.

It has already been indicated that the type of resin employed in the practice of the present invention is one which, in an intermediate stage of synthesis, is a mobile liquid which can be readily pumped into the formation. It must also have the property of undergoing further synthesis at relatively low temperatures, of the order encountered in oil producing formations traversed by a bore hole, as, for example, temperatures within the range of 75° to 250° F. In the Gulf Coast, the majority of the producing formations are between about 4,000 and 10,000 feet in depth. As a result, the formation temperatures encountered are ordinarily well within the range of 125° to 220° F. Many resins capable of fairly rapid hardening within this temperature range are available for the practice of the present invention.

In practicing this invention, the first step is to stop the production of oil from the well or, in other words, kill the well, by forcing water down through a producing string and filling up the space between the casing and the producing string with water or mud, which exerts a sufficient pressure on the producing formation to hold back the fluid therein. The resin in the liquid state is then introduced into the tubing and forced downwardly while bleeding off a corresponding amount of water from the upper end of the casing, until the space opposite the producing formation is filled with the resin. The bleeding off valve at the top of the casing is then closed, and pressure is applied to the fluid in the tubing until the desired amount of resin is forced into the formation. The residual resin remaining at the bottom of the hole opposite the formation may then be pumped out by resuming circulation of the water. Preferably a period of time sufficient to permit an increase in viscosity of the resin is allowed between the forcing of the resin into the formation and the resumption of circulation for removal of the residual resin from the bottom of the hole. This waiting period insures the retention of the resin in the formation during the flushing out of the hole. After the residual resin is removed from the hole, the fluid columns are maintained over the producing formation for a predetermined period of time to permit the further synthesis of the resin to solidification. This period will, of course, depend upon the nature of the resin and on the temperature of the producing formation. After this has terminated the well is put back on production. This is usually done by pumping the water out of the casing and the producing string, whereby the formation pressure becomes sufficient to cause resumption of flow of fluid from the formation into the producing string.

There are many types of resins which are adaptable for use in the present invention. These resins are well known and their properties and the conditions under which they are formed are also common knowledge. Among the most suitable resins which have been employed in the practice of the present invention are the phenol aldehyde resins, produced from alkylated phenols and formaldehyde. The greater the amount of alkylation of the phenol employed as the starting material, the greater, in general, will be the oil solubility of the resulting resin. An increase in alkylation can be achieved either by the multiplication of the number of a given alkyl group attached to the phenolic nucleus, or by increasing the size of the alkyl constituent. The resins obtained from cresols, for example, are of very poor oil solubility, while the resins obtained from the xylols have satisfactory oil solubility. When the alkyl group has at least three carbon atoms, oil solubility of the resulting resins is satisfactory. Suitable resins of this type are those obtained by the condensation of tertiary para amyl phenol, di-isobutyl phenol, or an xylenol with formaldehyde.

As is well known, these resins are produced by causing the substituted phenol and the aldehyde to react in an alkaline medium. For the purpose of the present invention, the starting materials, namely, the phenol and the aldehyde and the alkaline accelerator may be mixed and introduced as a mixture into the formation and held there a sufficient length of time to permit the formation of a solid resin. For best results and for accurate control of the treatment, however, it is greatly preferred to react the materials at the surface to form a liquid resin and to then introduce the liquid into the formation. By this expedient, the large bulk of water which is present during the reaction starting from the initial materials is dispensed with in the formation. That is to say, the intermediate product in the liquid state can be separated from the water which goes into the starting materials and this liquid product will contain the necessary amount of alkali and other ingredients to permit further reaction in the formation. This results in a greater concentration of the solid resin and a more effective water plugging in the formation.

Other resins which may be employed for the practice of the present invention are the glyptal type resins which have been rendered oil soluble by the inclusion in their composition of vegeable oils, such as tung oil. In general, the greater the amount of tung oil incorporated in the resin, the greater will be the solubility of the resin in petroleum oil. Other resins of this type include those obtained by condensing glycerol and phthalic anhydride with oleic acid or linseed oil. The manufacture of these modified resins is described in published literature in considerable detail. Other oil soluble resins, such as certain vinyl resins, modified urea aldehyde resins, certain styrene resins, and the like, well known in the art, may be utilized.

While cresols and unsubstituted phenols do not, per se, form satisfactory starting materials for the production of resins for use in the practice of the present invention, they may be advantageously incorporated with the alkylated phenols in substantial amounts to produce modified resins. Their incorporation in the starting material cheapens the procedure, and also lends flexibility, in that it provides one more variable for controlling the viscosity of the intermediate products and the solubility characteristics of final products in the formations. Additions of 5–15% of phenol or cresol to the tertiary para amyl phenol have been found to yield satisfactory resins for use in the practice of the present invention.

The method of practicing the present invention will be more clearly understood from the following detailed description of the accompanying drawing, in which the single figure is a vertical section in diagrammatic form of a producing well at one stage of the practice of the present invention.

Referring to the drawing in detail, numeral 1 designates a borehole lined with a casing 2. Numeral 3 designates an oil producing formation traversed by the borehole. The casing extends usually just to the top of the producing formation and a perforated liner 4 is attached to the lower end of the casing and extends across the face of the producing formation 3. Extending from a point opposite the producing formation to the surface is a tubing or producing string 5. It will be understood that the well is provided with the conventional casing and tubing head structures, which are omitted in the drawing for the sake of clarity. These structures include a means for sealing a casing at the surface, which is illustrated diagrammatically in the drawing by a cover identified by numeral 6. The casing at the surface is provided with a branch line 7 controlled by a valve 8, while the producing string carries a control valve 9.

At the start of the treatment of the present invention, water is circulated down the producing string 5 with valves 8 and 9 open until the annular space between the casing and the producing string and the latter itself are filled with water. Then the liquid resin or a mixture of the initial materials for the production of the desired resin is introduced into the tubing 5 and forced downwardly until it reaches a level indicated by numeral 10 in the casing. Ordinarily, the amount of resin which is to be injected into the formation is less than the volume of the producing string. As a result, the upper level of the resin will be at some point indicated by numeral 11 in the producing string. Then the valve 8 is closed and more water is introduced into the tubing string 5 under sufficient pressure to force the desired amount of resin into the formation 3. When this pumping step is completed, the fluid in the well is pumped out. As previously indicated, it is preferred to permit the fluid to stand for a predetermined period of time before pumping it out in order that an increase in viscosity in the resin may be effected. This period of time may vary from a few hours to several hours, depending upon the resin and the temperature of formation 3. The correct period of time may be determined in advance by observing the viscosity of the resin at various intervals at the formation temperature.

In a practical embodiment of the present invention, the resin employed was prepared by condensing para tertiary amyl phenol with formaldehyde. This condensation was conducted at the surface until an oil was produced. More specifically, 1994 lbs. of the alkylated phenol was mixed with 1350 lbs. of formalin (40% formaldehyde solution) and 200 lbs. of caustic, and an amount of water approximating 25% of the weight of the formalin, and the mixture was heated with an open jet of steam for about 15 or 20 minutes at 205 to 210° F. In this particular case, this period of time was sufficient to carry the reaction to the desired stage and cause a separation of the liquid resin. It will be understood that with different starting materials this period of time will be different, as will be the temperature. The separated oily layer was drawn off and its temperature quickly reduced to maintain its fluidity and in this condition it was introduced into the borehole.

The well treated with this resin was one producing a mixture of oil and water in the ratio of 37 parts of oil to 63 parts of water by volume. The treatment was effected in the manner indicated above with reference to the accompanying drawing. The resin pumped easily and entered the producing formation readily at moderate pump pressure. The producing formation consisted of 33 feet of sand occurring between 5110 and 5152 feet below the surface. About 9 bbls. of the resin were pumped into the producing section. The entire operation, including the time required to kill the well and pump the resin into place, was 12 hours. The well was allowed to stand undisturbed for 40 hours to insure solidification of the resin. The formation temperature was 170° F.

After the well was put back on production, it produced a mixture containing about 35% water and 65% oil. Thus, the treatment effected a reduction in the water-oil ratio of from 1.7 to .54. The total amount of fluid produced from the well was decreased, as might be expected, but, with the passage of time, this amount of fluid increased without any substantial increase in the water-oil ratio.

It will be apparent that various changes in the procedure outlined above can be introduced into the practice of the present invention without departing from the scope thereof. For example, methods conventional in the art for introducing the agent into the formation, other than the particular method described above, may be utilized. Resins having suitable characteristics for use in the present invention, other than those specifically referred to herein, may be employed, it being understood that when such resins are employed the time allowed for solidification of the resin in the formation will vary with the type of resin and with the temperature of the formation.

The nature and objects of the present invention having been thus described and illustrated, what is claimed as new and useful and is desired to be secured by Letters Patent is:

1. A method for selectively plugging formations producing oil and water traversed by a borehole to decrease the production of water therefrom, which comprises reacting a mixture of substances, capable of condensing to form a solid resin, soluble in oil and insoluble in water, to an intermediate oily stage, forcing the oily intermediate product into the formations to be treated, and holding them in place until the reaction is completed and said solid resin is deposited in the formations.

2. A method according to claim 1 in which the resin is one obtained by reacting an alkylated phenol with an aldehyde.

3. A method according to claim 1 in which the resin is one obtained by reacting with an aldehyde an alkylated phenol in which the alkyl groups contain at least three carbon atoms.

MILES C. LEVERETT.
GILBERT G. WRIGHTSMAN.